(12) United States Patent
Jaynes

(10) Patent No.: US 6,517,791 B1
(45) Date of Patent: Feb. 11, 2003

(54) SYSTEM AND PROCESS FOR GAS RECOVERY

(75) Inventor: Scot Eric Jaynes, Lockport, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/727,475

(22) Filed: Dec. 4, 2000

(51) Int. Cl.⁷ ............................ B01D 53/34; C01B 23/00
(52) U.S. Cl. .................... 423/210; 423/215.5; 423/219; 423/220; 423/235; 423/262
(58) Field of Search .............................. 423/210, 215.5, 423/219, 220, 235, 262

(56) References Cited

U.S. PATENT DOCUMENTS

| | | | | |
|---|---|---|---|---|
| 3,964,866 A | * | 6/1976 | Shelby | 23/252 R |
| 4,845,334 A | | 7/1989 | Stocks et al. | 219/121.59 |
| 5,158,625 A | | 10/1992 | Lhote et al. | 148/625 |
| 5,302,414 A | | 4/1994 | Alkhimov et al. | 427/192 |
| 5,377,491 A | | 1/1995 | Schulte | 62/63 |
| 5,391,358 A | * | 2/1995 | Heim | 422/171 |

FOREIGN PATENT DOCUMENTS

| | | | | |
|---|---|---|---|---|
| DE | 1252187 | * | 10/1967 | 423/262 |
| FR | 2129147 | * | 10/1972 | 423/262 |
| GB | 961925 | * | 6/1964 | 423/262 |
| JP | 4160010 A | * | 6/1992 | 423/262 |

* cited by examiner

Primary Examiner—Stanley S. Silverman
Assistant Examiner—Timothy C. Vanoy
(74) Attorney, Agent, or Firm—Steven T. Trinker

(57) ABSTRACT

This invention is directed to a three-stage process for recovering and purifying a helium gas, and a system for using the three-stage process. The steps comprises a) introducing a gas from a cold spray forming chamber to a particulate removing apparatus to form a particulate-free helium gas, and recycling a first portion of the particulate-free helium gas back to the chamber; b) passing a second portion of the particulate-free helium gas to a first compressor prior to passing a helium gas purification membrane to form a purified helium gas and an exhaust gas, and passing the purified helium gas to mix with the first portion of particulate-free helium gas to the chamber; and c) passing a third portion of the particulate-free helium gas to a liquid separator apparatus to remove water and a receiver to dampen any pulsation to form a liquid-free helium gas, and recycling the liquid-free helium gas to said cold spray forming chamber.

8 Claims, 2 Drawing Sheets

SYSTEM AND PROCESS FOR GAS RECOVERY

FIELD OF THE INVENTION

The present invention relates to the recovery of gases, and more particularly to the recovery of helium gas in the cold spray forming process.

BACKGROUND OF THE INVENTION

Helium is the gas of choice for cold spray forming (CSF) process. However, the use of helium is economically prohibitive without sufficient helium recovery.

Generally, high velocities are necessary to accelerate the CSF powder towards the work piece. At 5 mole % nitrogen in helium, the sonic velocity will drop 8%. If the nitrogen concentration increases to 20 mole %, then the sonic velocity will reduce 33%. If a heavier impurity such as carbon dioxide reaches 20 mole % with the balance helium, then the sonic velocity will be reduced 43%. High gas velocities possible with pure helium are a desirable physical property regardless of the specific CSF application.

TABLE 1

Sonic Velocity as a Function of Gas Composition

| Helium Mole % | Nitrogen Mole % | Water Mole % | Carbon Dioxide Mole % | Temp. (F.) | Sonic Velocity (Ft/sec) |
| --- | --- | --- | --- | --- | --- |
| 100 | 0 | 0 | 0 | 100 | 3958 |
| 95 | 5 | 0 | 0 | 100 | 3467 |
| 90 | 10 | 0 | 0 | 100 | 3120 |
| 85 | 15 | 0 | 0 | 100 | 2859 |
| 80 | 20 | 0 | 0 | 100 | 2653 |
| 95 | 0 | 5 | 0 | 100 | 3645 |
| 95 | 0 | 0 | 5 | 100 | 3225 |
| 90 | 0 | 0 | 10 | 100 | 2788 |
| 85 | 0 | 0 | 15 | 100 | 2489 |
| 80 | 0 | 0 | 20 | 100 | 2267 |

CSF is a newly developed technology that as of this writing has not been made commercial. CSF can be compared to thermal spraying (TS) with a primary difference being the nozzle gas temperature. TS uses particle velocity combined with thermal heat to form a coating on a work piece. A description of both processes will show a problem associated with TS that is solved with CSF and why helium was not used before and is the gas of choice for CSF.

FIG. 1 shows a schematic of the equipment enclosure for CSF and TS. One TS application is plasma spray. Passing gas through an electric arc inside nozzle 14 forms the plasma. Thus, for TS, nozzle 14, must be water cooled or contain refractory to permit high temperatures. The expected life for nozzle 14 is usually less than 100 hours. Gas and powder pass through nozzle 14 to form spray pattern 16. Typical nozzle gases could be a mixture of argon and hydrogen. In spray pattern 16 the hydrogen will combust to add additional heat to the powder. The powder will partially or completely melt in spray pattern 16 before hitting work piece 18 and forming a coating on work piece 18. Care must be taken that work piece 18 does not become too hot or the coating applied too thick. If the coating is too hot or applied too thick, then the coating will crack upon cooling. Care must also be taken in selecting the powder particle size. If the particle size is too small, then losses from vaporization will be economically prohibitive. Spray pattern 16 uses gas velocity and density to accelerate the particle at work piece 18. High temperatures present in spray pattern 16 decrease gas density which minimizes the impact of gas velocity on particle velocity. TS particle velocities of up to 200 m/s could be expected. Helium can provide higher gas velocities but the density would be substantially lower.

TS may require that a separate fluid be used to cool work piece 18. The separate fluid could be liquid carbon dioxide or water. Air is also passed through enclosure 12 through gas inlet 22. A high volume of air passes over work piece 18 and removes excess powder that did not adhere as the coating. The air and powder exhaust from enclosure 12 through gas discharge port 20. If helium were used in nozzle 14, then using air to sweep work piece 18 would make helium recovery and purification difficult and expensive.

CSF differs from TS in that at ambient temperatures the powder can be accelerated with helium to about 1000 to about 1200 m/s in nozzle 14 to work piece 18. CSF temperatures in nozzle 14, typically less than about 400° F., allows the use of particulate less than 20 micron in size and containing volatile alloying elements. The high velocities capable with helium give the particles sufficient energy to fuse into a coating when striking work piece 18. The resulting coating does not cause work piece 18 substrate to change as could happen if it was exposed to TS temperatures. Helium is also passed through inlet 22 to sweep over work piece 18 and remove excess powder. The helium and powder discharge from enclosure 12 through vent 20 to helium recovery and purification equipment. In CSF, helium ultimately serves two functions. One, it accelerates the coating powder, supplying kinetic energy. Two, it serves as a clean sweeping gas to clean the work piece of extraneous particles.

No known helium recovery system is believed to exist for CSF. The absence of helium recovery systems for CSF is not surprising because current CSF processes are lab scale and use small quantities of helium. However, other processes that use larger volumes of helium have helium recovery systems.

U.S. Pat. No. 5,377,491 discloses a coolant gas recovery process for a fiber optic cooling tube that uses a vacuum pump/compressor to remove cooling gas from the cooling tube, remove particulate and contaminants and then return the coolant gas to the fiber optic cooling tube. Purification equipment such as pressure swing adsorption, dryer and membrane are discussed with respect to removing water and oxygen, with the maximum quantity of oxygen in the range of 1 to 50 mole percent, and the cooling tube required to cool gas at 0 to 150 psig.

U.S. Pat. No. 4,845,334 discloses a plasma furnace gas recovery system where the gas exits the furnace at high temperature (~700 C) and low pressure (<2 psig). The discharge gas is cooled and then followed by particulate removal equipment. The particulate free gas is then compressed, filtered again and then dried. The dry, compressed helium is then recycled back to the furnace at pressure using gas flows and pressures of 150 SCFM and 100 psig via an oil flooded screw machine.

U.S. Pat. No. 5,158,625 discloses a process for removing helium from a metal hardening (quenching) chamber, purifying the helium and compressing the helium. The quenching chamber was described as 10 M$^3$ with helium at 2.5 bar absolute (875 SCF of helium). Helium and impurities may be recovered from the hardening furnace through a vacuum pump. Down stream of the vacuum pump the helium plus impurities would be compressed and stored in one receiver.

Once all of the desired helium from the hardening furnace was removed, then helium with impurities was passed through a membrane, dryer, PSA or catalytic oxidation of hydrogen to remove oxygen and water from the process. The purified helium is then compressed again and stored at pressure in another receiver until the next hardening cycle starts. The above process uses higher than atmospheric pressures in the quenching chamber to increase the helium density and thus improve the heat transfer capability.

The prior art does not teach or suggest the recovery and purification system comprised of three continuous loops involving the strategic placement of the purification equipment. Further, each loop has its own separate function. In addition to purification and recovery, the current invention is capable of pressurizing the helium to achieve the requisite sonic velocity.

OBJECTS OF THE INVENTION

It is therefore an object of the invention to provide a cost effective helium recovery system that will provide acceptable helium purity (>80 mole %), volume and pressure at the CSF nozzle and for the cleansing sweep across the work piece.

It is another object of this invention to provide for a helium recovery system that will remove contaminants such as oxygen, nitrogen, water, carbon dioxide and particulate from the helium.

SUMMARY OF THE INVENTION

This invention is directed to a three-stage process for recovering and purifying a gas. The steps comprises a) introducing a gas from a chamber to a particulate removing apparatus to form a particulate-free gas, and recycling a first portion of the particulate-free gas to the chamber; b) passing a second portion of the particulate-free gas to a first compressor prior to passing a selective gas purification membrane to form a purified gas and an exhaust gas, and passing the purified gas to mix with the first portion of particulate-free gas to the chamber; and c) passing a third portion of the particulate-free gas to a liquid separator apparatus and a receiver to form a liquid-free gas, and recycling the liquid-free gas to said chamber.

In another embodiment, this invention is directed to a three-stage system for recovering and purifying a gas. This system comprises a) a first stage for introducing a gas from a chamber to a particulate removing apparatus to form a particulate-free gas, and recycling a portion of the particulate-free gas to the chamber; b) a second stage for passing a second portion of the particulate-free gas to a first compressor prior to a selective gas purification membrane to form a purified gas and an exhaust gas, and passing the purified gas to mix with the first portion of particulate-free gas to the chamber; and c) a third stage for passing a third portion of the particulate-free gas to a liquid separator apparatus and a receiver to form a liquid-free gas, and recycling the liquid-free gas to the chamber.

The second stage may comprise adding helium to mix with the second portion of particulate-free gas prior to passing the second portion of particulate-free gas to the first compressor. The first stage may comprise a circulation unit for circulating the flow of gas. The second stage may comprise a gas analyzer to determine the purity of the second portion of particulate-free gas. The selective gas purification membrane may comprise a membrane selected from helium. The third stage may comprise a second compressor, cooler and a liquid separator apparatus. A recovery unit and an adsorption unit may also be added.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
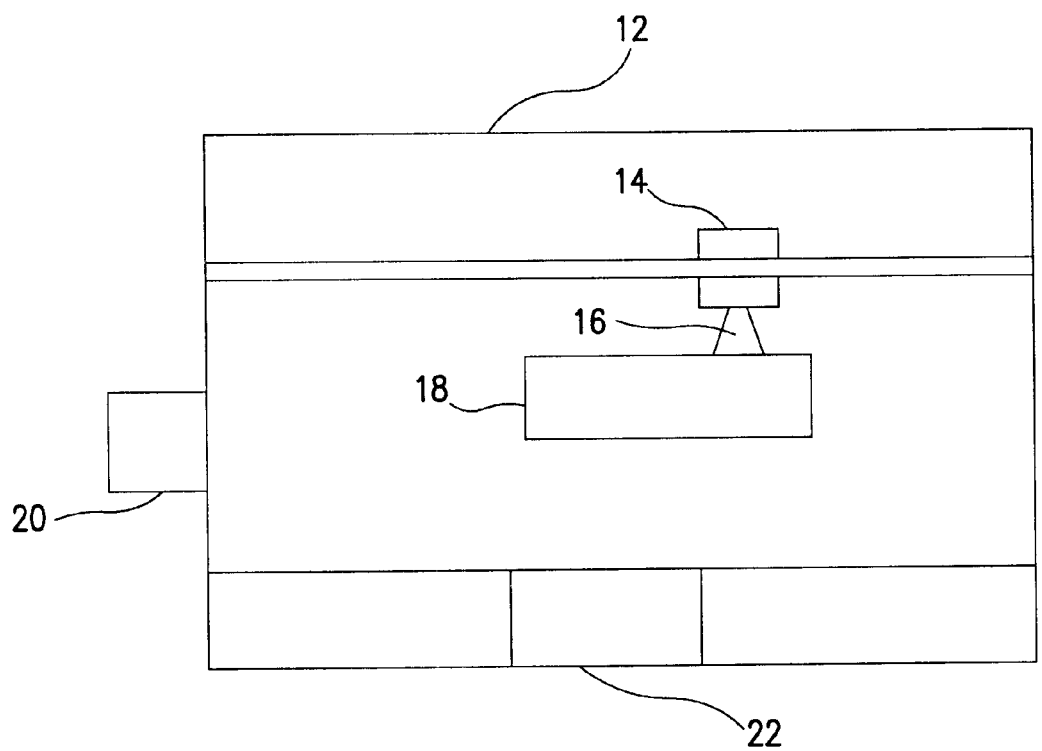
FIG. 1 is a schematic representation of the CPF process according to this invention.
Figure 2:
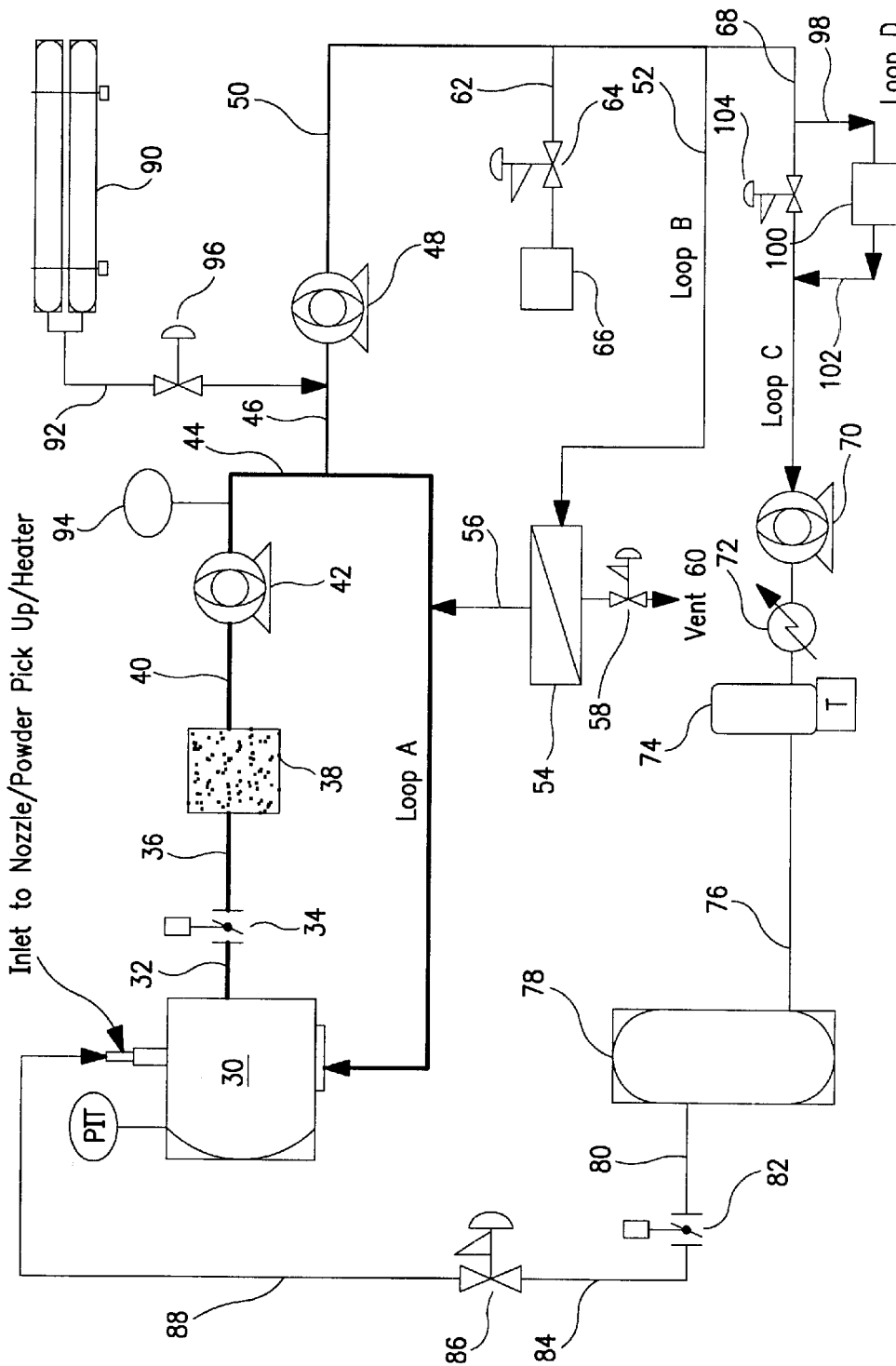
FIG. 2 is a schematic representation of recovering the gas use in the CPF process according to this invention.

There is no disclosure in the prior art disclosing recycling and purifying helium using the volume and pressure requirements for a CSF helium recovery system. The flow rates for the CSF are substantially different for that known in the art. The present invention has three separate loops that operate continuously. Each loop has a different function. First, the invention uses a fan in Loop A to recycle helium from the CSF chamber through particulate removal and back to the CSF chamber to supply the cleansing sweep (FIG. 2). The flow in Loop A must remove particulate from the chamber. The flow rates in Loop A are preferably 1000 SCFM or more. A portion of the gas cycling in Loop A is removed to supply Loop B and Loop C. The invention uses a compressor to remove the gas from Loop A. The amount of gas removed will depend on the number of nozzles and the purity requirements. If the CSF chamber contains one nozzle that requires helium having a purity of at least 90%, preferably at least 95%, then the flows in Loop B and Loop C are approximately 80 SCFM and 125 SCFM respectively. Loop C uses a compressor to increase the pressure and control the flow of gas to the nozzle.

One could consider providing the nozzle and cleansing sweep flow from a single compressor in Loop A. Having a compressor would eliminate Loop C. However, the low pressure cleansing sweep flow in this example is approximately eight times that of the nozzle flow. The nozzle pressure is at least 20 times or more than the cleansing sweep pressure. Therefore, the capital cost and the operating cost would be several times the respective costs for a fan and compressor combined as described above in Loops A and C.

The invention must use purification to maintain the desirable properties of helium and remove impurities that would harm the coating or substrate.

The invention also can use PSA, TSA, membrane, catalytic oxidation and cryogenic separation to remove impurities. However, any impurity in the helium can become a process-limiting agent for CSF. Therefore, depending on the application, the purification system must remove nitrogen, oxygen, water, carbon monoxide, carbon dioxide, hydrogen and possibly light hydrocarbons. The majority of impurities will occur when parts enter and leave the CSF chamber. Some CSF applications will process larger parts that are placed in the CSF chamber one at a time. As the parts are placed in the CSF chamber, helium will escape and air will enter into the chamber. The same will occur when the parts are removed from the CSF chamber. An evacuation of the chamber before and after the parts are placed in the enclosure would minimize the amount of helium lost and the amount of air that enters into the enclosure. Even though an evacuation of the enclosure would improve helium recovery, the time cycle extension and capital required for vacuum capable equipment may not justify the effort.

Higher molecular weight impurities will significantly lower the sonic velocity of helium. Higher sonic velocities than heavier gases is one of helium's several unique physical properties that make it the gas of choice for cold spray forming. A typical commercial application is expected to require helium purities of greater than about 85%, preferably greater than about 90% and most preferably greater than about 95%. Helium recoveries of greater than about 90% (based on the flow in Loop C) are expected.

Table 2 shows the different purification technologies to meet different gas specifications. The gas specification is dependent on process conditions and materials used for the coating process. For example, Items #1, 10, and 13 are discussed. Item #1 describes a process where equipment allows very little oxygen to leak into the process but requires gas with high purity. A copper oxide getter will effectively remove oxygen to the low PPMV levels. The process of Item #10 shows a process where two different purification technologies located apart from each other provides the most economical purification strategy. The membrane will remove nitrogen and oxygen in Loop B while the TSA will remove water in Loop D.

In Item #13, the gas specification is less than 2% air, and 10% air was admitted into Loop A when the parts were placed in to the CSF chamber. The CSF process would start with Loop A and Loop B, while Loop C would not start until the gas specification is reached as measured by oxygen analyzer 19. If oxygen analyzer 19 signals an acceptable level of oxygen, then Loop C starts up and Loop B would continue to increase the helium purity.

TABLE 2

Purification Vs Impurities in CSF Off-Gas

| Item # | Impurities (Figure 2, #40) | Type of Purifier/Location | Gas Specifications (Figure 2, #88) |
|---|---|---|---|
| 1 | 10 PPM to 100 PPM Oxygen Only | Copper Oxide Getter/#68 | <20 PPM $O_2$<br><20 PPM $N_2$<br><20 PPM $H_2O$ |
| 2 | $H_2O$ Only | TSA/#54 or #100 | <20 PPM $O_2$<br><20 PPM $N_2$<br><20 PPM $H_2O$ |
| 3 | 10 PPM $H_2O$<br>10 PPM $O_2$ | Copper Oxide Getter & TSA/#13 or #100 | <20 PPM $O_2$<br><20 PPM $N_2$<br><20 PPM $H_2O$ |
| 4 | <2 PPM $O_2$<br><2 PPM $N_2$<br><2 PPM $H_2O$ | Cryogenic Adsorption/#100 | <20 PPM $O_2$<br><20 PPM $N_2$<br><20 PPM $H_2O$ |
| 5 | <4 PPM $O_2$<br><4 PPM $N_2$<br><4 PPM $H_2O$ | Modified Cryogenic Adsorption or PSA/#100 | |
| 6 | <6 PPM $O_2$<br><6 PPM $N_2$<br><6 PPM $H_2O$ | Modified Cryogenic Adsorption or PSA/#100 | <20 PPM $O_2$<br><20 PPM $N_2$<br><20 PPM $H_2O$ |
| 7 | <8 PPM $O_2$<br><8 PPM $N_2$<br><8 PPM $H_2O$ | Modified Cryogenic Adsorption or PSA/#100 | <20 PPM $O_2$<br><20 PPM $N_2$<br><20 PPM $H_2O$ |
| 8 | <10 PPM $O_2$<br><10 PPM $N_2$<br><10 PPM $H_2O$ | PSA/#100 | <20 PPM $O_2$<br><20 PPM $N_2$<br><20 PPM $H_2O$ |
| 9 | <2 PPM $O_2$<br>10% $N_2$ | Membrane/#54 | <20 PPM $O_2$<br>1% $N_2$ |
| 10 | <2 PPM $O_2$<br>10% $N_2$<br><2 PPM $H_2O$ | Membrane and TSA/#54 and #100 | <20 PPM $O_2$<br>1% $N_2$<br><20 PPM $H_2O$ |
| 11 | >2 PPM $O_2$<br>10% $N_2$<br><2 PPM $H_2O$ | Membrane, TSA and Copper Oxide Getter/#54 and #100 | <20 PPM $O_2$<br>1% $N_2$<br><20 PPM $H_2O$ |
| 12 | >2 PPM $H_2O$ | Chiller/#23 | <2000 PPM $H_2O$ |
| 13 | 10% air at start of coating cycle | membrane | <2% AIR |

TABLE 2-continued

Purification Vs Impurities in CSF Off-Gas

| Item # | Impurities (Figure 2, #40) | Type of Purifier/Location | Gas Specifications (Figure 2, #88) |
|---|---|---|---|
| 14 | >100 PPMV | TSA or PSA/#100 | <1000 PPMV |
| 15 | >2 PPMV | TSA or PSA/#100 | <10 PPMV |

FIG. 2 provides a schematic of the systems of this invention and the process therefore. The CSF process involves applying a coating to a part inside CSF chamber 30. The chamber geometry will partly depend on size and geometry. In an embodiment of this invention, the part is loaded into the CSF chamber one at a time and one nozzle is used to coat the part. The opening of the enclosure removes the coated part, and releases about 8 cubic feet (CF) of helium and allows 8 CF of air to enter the enclosure. Furthermore, Loop A contains about 80 CF of gas. At start up, fan 42 will draw on CSF chamber 30 and pull gas through duct 32, valve 34, particulate removal 38 and ducts 36 and 40. Fan 42 will discharge into duct 44 at slightly more than 15 psia. A portion of flow in duct 44 will enter duct 46 while the remaining portion will continue past the entrance of duct 46 to the exhaust of duct 56. Purified helium from duct 56 will enter duct 44 and continue onto CSF chamber 30. The helium from Loop A will be used to clean sweep the work piece.

Gas entering duct 46 will feed the suction of compressor 48. Compressor 48 will discharge into duct 50 at approximately 180 psig. A portion of gas in duct 50 will enter duct 62 and pass through regulator 64 to oxygen analyzer 66. Oxygen analyzer 66 will sound an alarm if the oxygen content of the gas is above specification. If the gas is above specification, then the operator or software will decide if the coating process should start or continue. If the coating process is not started then the most economical operation of the equipment is to not start Loop C until gas is within specification. However, for alternate equipment configurations where purification occurs in Loop C or Loop D then operation of the compressor in Loop C is needed.

The remaining portion in duct 50 after passing duct 62 will continue to duct 52 and duct 68. Duct 52 is the inlet to Loop B. Gas passes through duct 52 to membrane 54. Retentate leaves the membrane through back pressure regulator 58 to vent 60. The purified helium leaves the membrane as permeate (low pressure side) through duct 56 and enters duct 44 as described above. Table 3 shows the results when 10% dry air in helium is the feed to a membrane. The permeate stream that will enter duct 56 will have 97.5% pure helium. As the gas from duct 56 mixes with the gas in duct 44, the impurity concentration will drop.

TABLE 3

Membrane Simulation 1, 10% Dry Air in Feed

| MOD. NO. | FIBER OD mils | FIBER ID mils | ACTIVE LENGTH ft | POTTED LENGTH ft | AREA $ft^2$ |
|---|---|---|---|---|---|
| 1 | 14.00 | 7.50 | 5.667 | 0.267 | 5005.1 |

CALCULATED PROCESS PARAMETERS

| | FEED | RAFF | PERM |
|---|---|---|---|
| Stream # | #1 | #2 | #3 |
| F,MMSCFD(60F) | 1 | 0.08531 | 0.9147 |

TABLE 3-continued

| | | | |
|---|---|---|---|
| PRESS, psia | 195.00 | 195.00 | 16.00 |
| TEMP, F. | 108.00 | 108.00 | 108.00 |
| Molec. Weight | 6.49 | 26.09 | 4.66 |
| Viscos, cp | 0.0212 | 0.0190 | 0.0208 |
| CONCENTRATIONS, mol % | | | |
| HELIUM | 90.0000 | 10.0000 | 97.4611 |
| NITROGEN | 7.9000 | 77.9749 | 1.3646 |
| OXYGEN | 2.1000 | 12.0251 | 1.1744 |

Percent recovery of HELIUM in stream No 2 = 0.95
Percent recovery of NITROGEN in stream No 2 = 84.20
Percent recovery of OXYGEN in stream No 2 = 48.85

Table 4 shows that as the feed to the membrane increases in purity, then the gas entering duct 56 will also increase in purity. In addition, as the feed helium purity increases, then the retentate flow rate decreases. Decreasing the retentate flow rate improves helium recovery.

TABLE 4

Membrane Simulation 2, 10% Air in Feed

| MOD. NO. | FIBER OD Mils | FIBER ID mils | ACTIVE LENGTH ft | POTTED LENGTH ft | AREA ft$^2$ |
|---|---|---|---|---|---|
| 1 | 14.00 | 7.50 | 5.667 | 0.267 | 3752.4 |

CALCULATED PROCESS PARAMETERS

| Stream # | FEED #1 | RAFF #2 | PERM #3 |
|---|---|---|---|
| F,MMSCFD(60F) | 1 | 0.01178 | 0.9882 |
| PRESS, psia | 195.00 | 195.00 | 16.00 |
| TEMP, F. | 108.00 | 108.00 | 108.00 |
| Molec. Weight | 4.66 | 27.63 | 4.39 |
| Viscos, cp | 0.0208 | 0.0191 | 0.0207 |
| CONCENTRATIONS, mol % | | | |
| HELIUM | 97.4600 | 5.0000 | 98.5619 |
| NITROGEN | 1.3600 | 74.4417 | 0.4890 |
| OXYGEN | 1.1800 | 20.5585 | 0.9490 |

Percent recovery of HELIUM in stream No 2 = 0.06
Percent recovery of NITROGEN in stream No 2 = 64.47
Percent recovery of OXYGEN in stream No 2 = 20.52

Duct 68 starts Loop C. Gas enters Loop C at from about 100 psig to about 270 psig, preferably about 155 psig to about 195, and most preferably about 175 psig and is further compressed by compressor 70 to from about 270 psig to about 1130 psig, preferably from about 300 psig to about 1100 psig depending on the application. Higher pressures will allow for higher velocities at the nozzle in CSF chamber 30. High pressure gas passes through cooler 72 and water separator 74, to remove any condensed water. The water separator is placed after the compressor since water will condense first at higher pressures keeping gas temperature the same. For additional water removal the water separator can be augmented with a chiller to lower the gas temperature. Duct 76 delivers gas to receiver 78, which is sufficiently large to dampen any pulsation in the gas flow that could come from a diaphragm or reciprocating compressor. Gas flows from receiver 78 into duct 80 and through valve 82, which opens when the operator is ready to start coating the part in CSF chamber 30. Gas flows into duct 84 through regulator 86. Regulator 86 ensures that the pressure entering duct 88 is the desired nozzle pressure. The gas from here enters the CSF chamber in order to assist in coating the work piece. The helium gas picks up the powder and speeds it up to supply the kinetic energy required for coating. As discussed in Table 2 the gas specification will depend on the application.

Helium make-up comes from helium storage 90 through duct 92 and valve 96 into duct 46. Valve 96 opens when pressure as measured at pressure indicator 94 falls below set point.

This invention also contemplates placing the membrane in duct 68 and feeding the permeate to the suction of compressor 20. Putting the membrane in duct 68 is desirable if impurities continuously entered duct 32 from CSF chamber 30. A continuous supply of parts into CSF chamber 30 by a conveyor belt or some other mechanism would be an example of when impurities would continuously enter duct 32.

As the gas specification becomes significantly less than 2% impurities in helium, a pressure swing adsorption or cryogenic adsorption unit may optionally be needed. Duct 98 would take a portion of gas from duct 68 pass it through the pressure swing adsorption unit 100. The pure helium would then enter duct 102 and mix with impure gas in duct 68. The mixture of gases from duct 68 and duct 102 would meet the gas specification. Regulator 104 would create the needed pressure drop in duct 68 to force gas through pressure swing adsorption unit 100. As the level of gas purity specification increases, the percentage of gas that passes through Loop D also increases. For specifications of less than 2 ppm, then the pressure swing adsorption unit or cryogenic adsorption unit would be placed in duct 68.

If CSF chamber 30 uses evacuation to recover helium and remove air impurities before a part is ready for the coating process Loop B could be removed and Loop D remain for high purity helium applications. If CSF chamber 30 is evacuated and the gas specification is maintainable by a membrane then Loop B would remain.

If CSF chamber 30 uses evacuation and oxygen must be kept to low levels, then a copper oxide getter could control the oxygen. A membrane would then maintain other impurities to acceptable levels. Similarly, if oxygen or other chemical content must be controlled to a certain level, such as to control a reaction with the coating, then a getter or catalytic oxidation could be used. An example would be a slight oxide layer on an aluminum coating to passivate the metal. Such a system may use hydrogen and a catalyst to react some part or all of the oxygen. The hydrogen would be maintained in the system to a certain level or hydrogen would be introduced into the system at particular level of oxygen. The water from the hydrogen, oxygen reaction would then be removed in separator 74.

Flow rate in recovery systems described above assumed one nozzle in the CSF chamber. However, a particular application may have several nozzles in one chamber with each requiring more than about 100 SCFM of helium. For multi-nozzle applications the flows will significantly increase over what was described above.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A three-stage process for recovering and purifying a gas comprising:
    a) introducing a gas from a chamber to a particulate removing apparatus to form a particulate-free gas, and recycling a first portion of the particulate-free gas to the chamber;
    b) passing a second portion of the particulate-free gas to a first compressor prior to passing a selective gas purification membrane to form a purified gas and an exhaust gas, and passing the purified gas to mix with the first portion of particulate-free gas recycled to the chamber;

c) passing a third portion of the particulate-free gas to a liquid separator apparatus and a receiver to form a liquid-free gas, and recycling the liquid-free gas to said chamber.

2. The process of claim 1 further comprising adding helium to mix with the second portion of particulate-free gas prior to passing the second portion of particulate-free gas to the first compressor.

3. The process of claim 1 comprising passing the compressed second portion of particulate-free gas into a gas analyzer to determine gas purity.

4. The process of claim 1 wherein the selective gas purification membrane comprises a membrane selective for helium.

5. The process of claim 1 further comprising passing a third portion of the particulate-free gas through a second compressor and a cooler prior to passing the third portion of the particulate-free gas through the liquid separator apparatus.

6. The process of claim 5 further comprising passing the third portion of the particulate-free gas through the liquid separator to a recovery unit prior to recycling to the chamber.

7. The process of claim 5 further comprising passing a portion of the third portion of the particulate-free gas to an absorption unit prior to the second compressor.

8. The process of claim 1 further comprising introducing hydrogen into the third portion of the particulate-free gas to react with the oxygen prior to passing the third portion of particulate-free gas through the liquid separation apparatus.

* * * * *